(12) United States Patent
Tomizawa et al.

(10) Patent No.: US 11,217,364 B2
(45) Date of Patent: Jan. 4, 2022

(54) INSULATED WIRE, COIL, AND ELECTRIC/ELECTRONIC EQUIPMENTS

(71) Applicant: ESSEX FURUKAWA MAGNET WIRE JAPAN CO., LTD., Tokyo (JP)

(72) Inventors: Keiichi Tomizawa, Tokyo (JP); Daisuke Muto, Tokyo (JP); Satoshi Saito, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 0 days.

(21) Appl. No.: 16/935,426

(22) Filed: Jul. 22, 2020

(65) Prior Publication Data

US 2021/0005346 A1 Jan. 7, 2021

Related U.S. Application Data

(63) Continuation of application No. PCT/JP2019/004970, filed on Feb. 13, 2019.

(30) Foreign Application Priority Data

Feb. 16, 2018 (JP) .............................. JP2018-025805

(51) Int. Cl.
*H01B 7/02* (2006.01)
*H01F 5/06* (2006.01)
(Continued)

(52) U.S. Cl.
CPC ................. *H01B 7/02* (2013.01); *H01F 5/06* (2013.01); *H01B 3/306* (2013.01); *H01B 3/36* (2013.01); *H01B 3/441* (2013.01)

(58) Field of Classification Search
CPC . H01B 1/04; H01B 3/306; H01B 3/36; H01B 3/441; H01B 7/00; H01B 7/02;
(Continued)

(56) References Cited

U.S. PATENT DOCUMENTS 504,397 A * 9/1893 Marsh .................. H01B 7/0233
174/28
1,639,820 A * 8/1927 Varney ..................... H02G 7/14
174/42
(Continued)

FOREIGN PATENT DOCUMENTS

CN 106062893 A 10/2016
CN 106104707 A 11/2016
(Continued)

OTHER PUBLICATIONS

Chinese Office Action and Search Report, dated Apr. 6, 2021, for corresponding Chinese Application No. 201980007945.7, with English machine translations.
(Continued)

*Primary Examiner* — Krystal Robinson
(74) *Attorney, Agent, or Firm* — Birch, Stewart, Kolasch & Birch, LLP

(57) ABSTRACT

An insulated wire containing a thermoplastic resin layer (A) as a covering layer directly or indirectly on a rectangular conductor, in which the insulated wire has at least one protruding part which is continuous in a longitudinal direction of said insulated wire, on a surface of a portion of the thermoplastic resin layer (A), which portion corresponds to at least one side of a cross-section of the insulated wire, said protruding part and a flat part of the surface having the protruding part forms a curved portion with a radius of curvature of 0.01 to 0.75 mm in the cross-section of the insulated wire, and a lateral face of the protruding part has a slope of less than 90° to the flat part of the surface having the protruding part in the cross-section of the insulated wire, a coil produced by processing the insulated wire by winding, and an electric/electronic equipment comprising the coil.

11 Claims, 4 Drawing Sheets

(51) Int. Cl.
*H01B 3/30* (2006.01)
*H01B 3/36* (2006.01)
*H01B 3/44* (2006.01)

(58) Field of Classification Search
CPC ........ H01B 7/184; H01B 17/28; H01B 19/00;
H01B 3/004; H01B 3/008; H01B 3/40;
H01B 7/0241; H01B 9/02; H01B 11/02
See application file for complete search history.

(56) References Cited

U.S. PATENT DOCUMENTS

| | | | | |
|---|---|---|---|---|
| 2,149,772 A * | 3/1939 | Vasser | .................... | H01B 9/006 |
| | | | | 174/26 R |
| 2,964,090 A * | 12/1960 | Raydt | .................... | B21D 15/04 |
| | | | | 72/77 |
| 3,760,092 A * | 9/1973 | Woolcock | ............... | H01L 39/14 |
| | | | | 174/15.5 |
| 3,864,508 A * | 2/1975 | Beck | ...................... | H01B 12/06 |
| | | | | 174/15.5 |
| 4,048,794 A * | 9/1977 | Falcy | ..................... | D07B 1/10 |
| | | | | 57/215 |
| 4,210,773 A * | 7/1980 | Haley | ................... | H01B 7/0045 |
| | | | | 174/72 A |
| 4,375,379 A * | 3/1983 | Luetzow | .............. | H01B 7/0838 |
| | | | | 156/292 |
| 4,381,420 A * | 4/1983 | Elliott | .................. | H01B 7/0838 |
| | | | | 174/117 A |
| 4,409,431 A | 10/1983 | Neuroth | | |
| 4,731,505 A * | 3/1988 | Crenshaw | ............. | G02B 6/443 |
| | | | | 138/110 |
| 4,923,410 A * | 5/1990 | Suzuki | ................. | H01R 12/775 |
| | | | | 439/492 |
| 5,808,238 A * | 9/1998 | Munakata | ................ | H02G 7/20 |
| | | | | 174/117 R |
| 5,990,419 A * | 11/1999 | Bogese, II | .......... | H01B 11/002 |
| | | | | 174/120 R |
| 6,316,104 B1 * | 11/2001 | Kumakura | ............. | C09J 167/00 |
| | | | | 428/375 |
| 6,331,677 B1 * | 12/2001 | Munakata | ............. | H01B 5/104 |
| | | | | 174/128.1 |
| 6,612,085 B2 * | 9/2003 | Edwards | ................... | E04C 5/03 |
| | | | | 52/649.1 |
| 7,271,344 B1 * | 9/2007 | Stutzman | ............... | H01B 7/184 |
| | | | | 174/113 R |
| 7,479,597 B1 * | 1/2009 | Cases | ................... | H01B 7/0009 |
| | | | | 174/115 |
| 8,198,536 B2 * | 6/2012 | Clark | ..................... | H01B 11/06 |
| | | | | 174/113 R |
| 9,245,669 B2 * | 1/2016 | Glew | ..................... | G02B 6/4434 |
| 10,293,770 B2 * | 5/2019 | Owens | ................. | B62D 25/087 |
| 10,665,363 B2 * | 5/2020 | Barr | ...................... | H01B 7/0823 |
| 10,784,014 B1 * | 9/2020 | Neveux, Jr. | ................ | C08J 9/06 |
| 2005/0211461 A1 * | 9/2005 | Horikoshi | .............. | H05K 3/244 |
| | | | | 174/117 FF |
| 2007/0240898 A1 * | 10/2007 | Reichert | .............. | H01B 7/0838 |
| | | | | 174/117 F |
| 2008/0296042 A1 * | 12/2008 | Heffner | ................. | H01B 13/143 |
| | | | | 174/113 R |
| 2009/0229852 A1 * | 9/2009 | Thuot | .................. | H01B 7/0275 |
| | | | | 174/113 R |
| 2009/0314376 A1 * | 12/2009 | Wagner | ................... | E04F 17/02 |
| | | | | 138/148 |
| 2010/0181093 A1 * | 7/2010 | Wiekhorst | ............. | H01B 7/184 |
| | | | | 174/113 R |
| 2010/0276178 A1 * | 11/2010 | Keller | .................. | H01B 7/0275 |
| | | | | 174/113 C |
| 2012/0187271 A1 * | 7/2012 | Komiya | ............... | H02G 3/0487 |
| | | | | 248/634 |
| 2012/0305308 A1 * | 12/2012 | Toyama | .............. | B60R 16/0207 |
| | | | | 174/70 R |
| 2013/0333913 A1 * | 12/2013 | Nonen | .................... | H01B 11/20 |
| | | | | 174/34 |
| 2015/0014017 A1 * | 1/2015 | Sugimoto | ............ | H02G 3/0406 |
| | | | | 174/68.3 |
| 2015/0096779 A1 * | 4/2015 | Nagayasu | ............ | H02G 3/0487 |
| | | | | 174/50 |
| 2016/0307668 A1 | 10/2016 | Oya et al. | | |
| 2017/0129423 A1 | 5/2017 | Sugino | | |
| 2018/0358856 A1 | 12/2018 | Oya et al. | | |
| 2019/0156978 A1 | 5/2019 | Tamura et al. | | |
| 2021/0012926 A1 * | 1/2021 | Hara | ......................... | H01F 5/06 |

FOREIGN PATENT DOCUMENTS

| | | |
|---|---|---|
| CN | 107068266 A | 8/2017 |
| JP | 2003-223817 A | 8/2003 |
| JP | 2006-22173 A | 1/2006 |
| JP | 2006-100039 A | 4/2006 |
| JP | 2008-288106 A | 11/2008 |
| JP | 2009-266797 A | 11/2009 |
| JP | 5019594 B2 | 9/2012 |
| WO | WO 2017/142036 A1 | 8/2017 |
| WO | WO 2018/025832 A1 | 2/2018 |

OTHER PUBLICATIONS

International Search Report, issued in PCT/JP2019/004970, dated Apr. 9, 2019.
Written Opinion of the International Searching Authority, issued in PCT/JP2019/004970, dated Apr. 9, 2019.
Extended European Search Report for corresponding European Application No. 19754238.4, dated Sep. 13, 2021.
Chinese Office Action and Search Report, dated Oct. 29, 2021, for corresponding Chinese Application No. 201980087945.7, with English machine translations.

* cited by examiner

{Fig. 1}
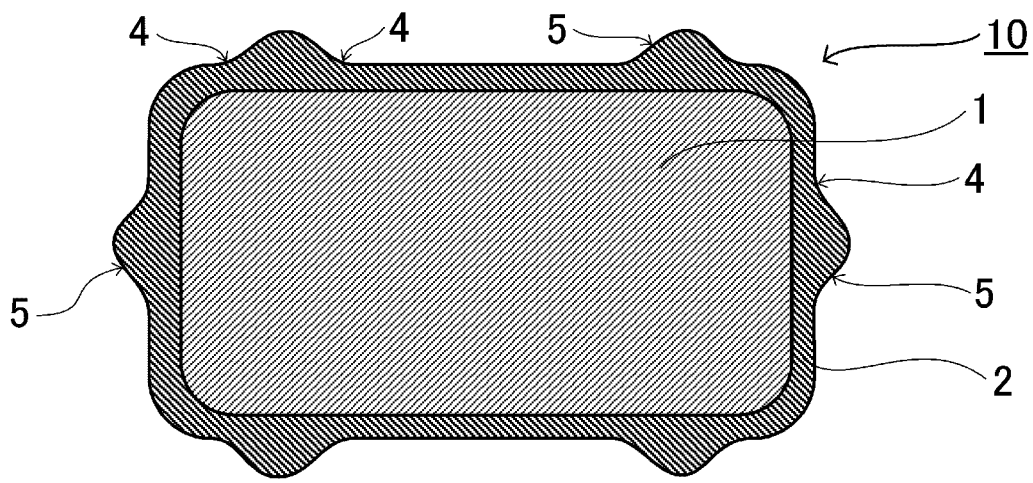
{Fig. 2}
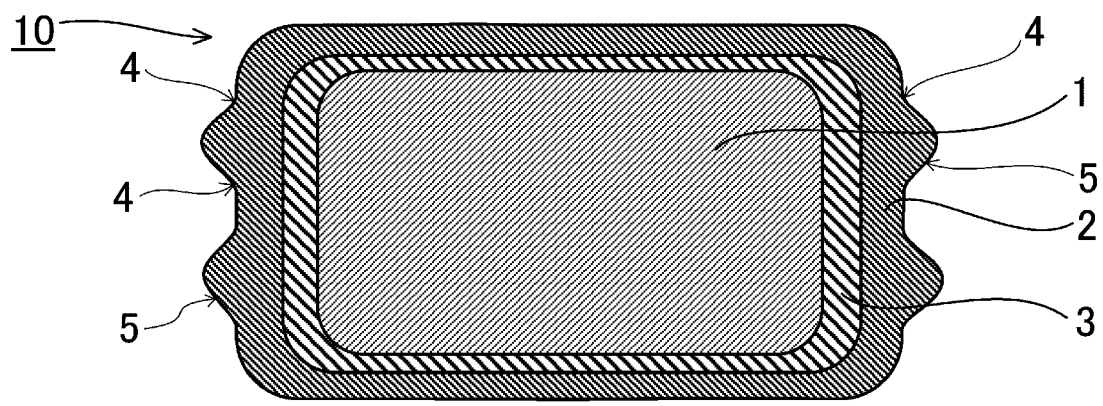
{Fig. 3}
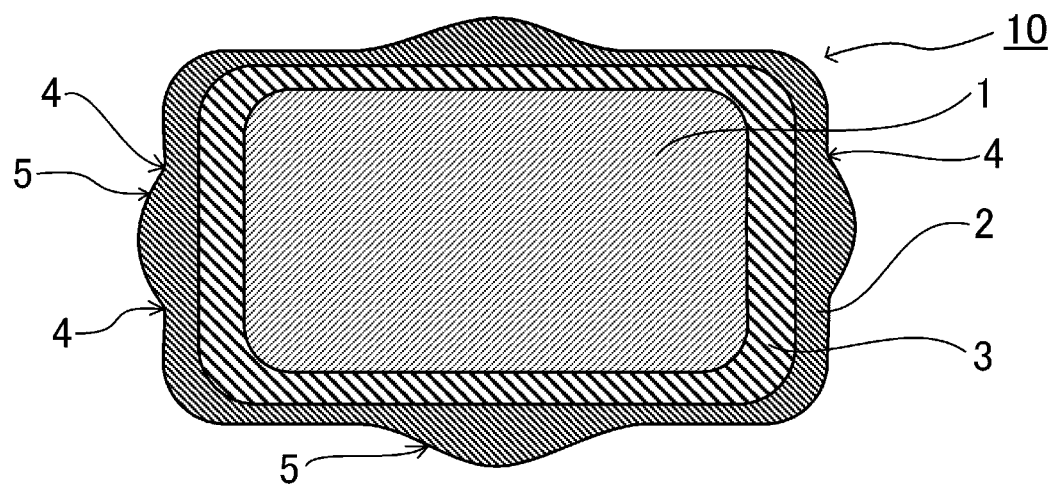

{Fig. 4}
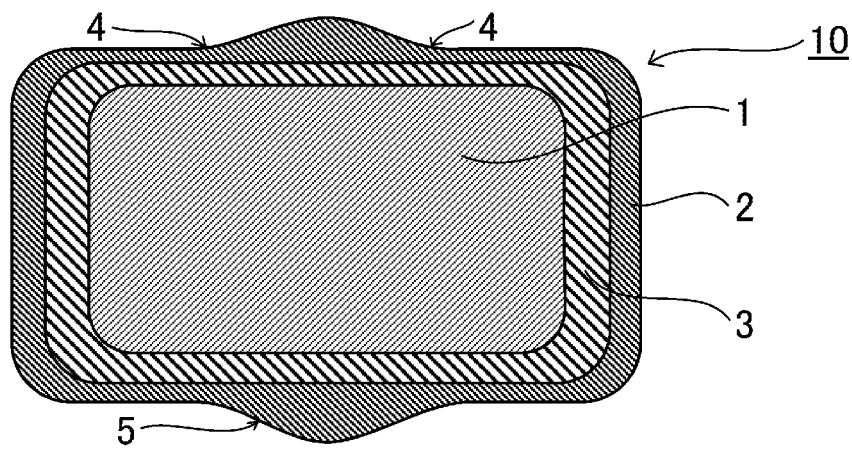
{Fig. 5}
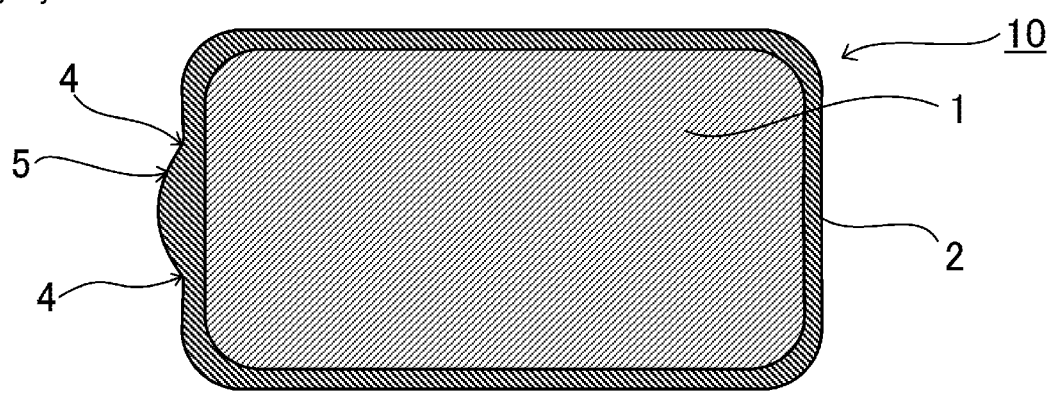
{Fig. 6}
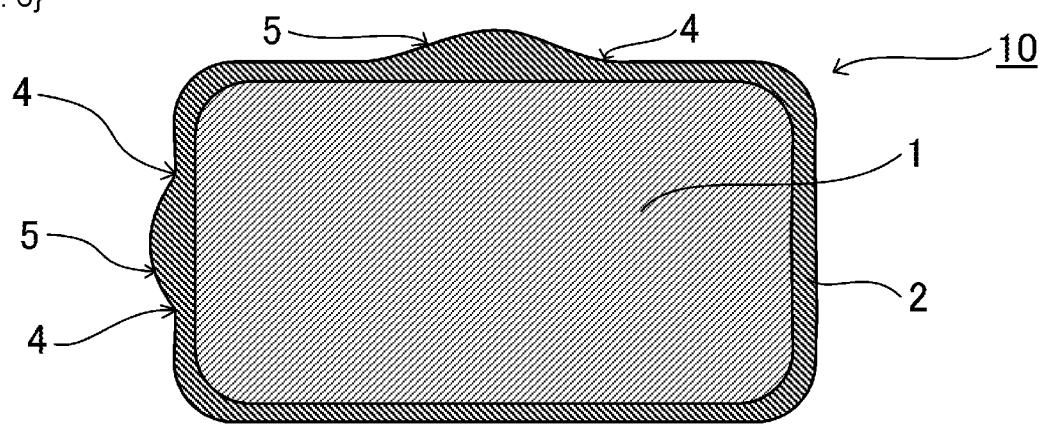

{Fig. 7}
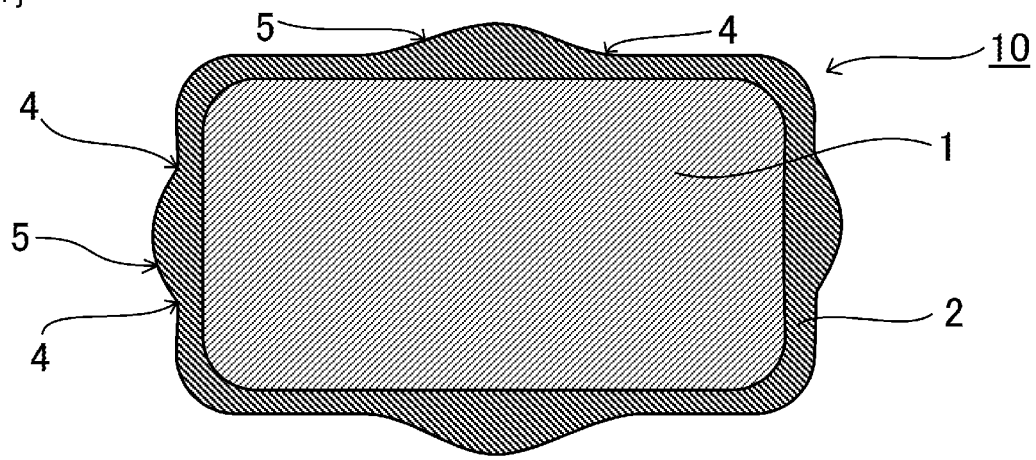
{Fig. 8}
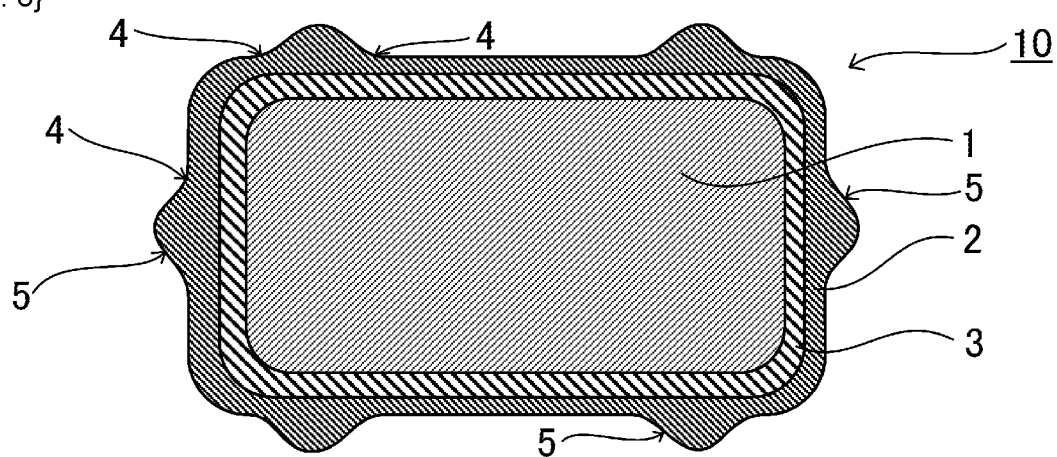
{Fig. 9}
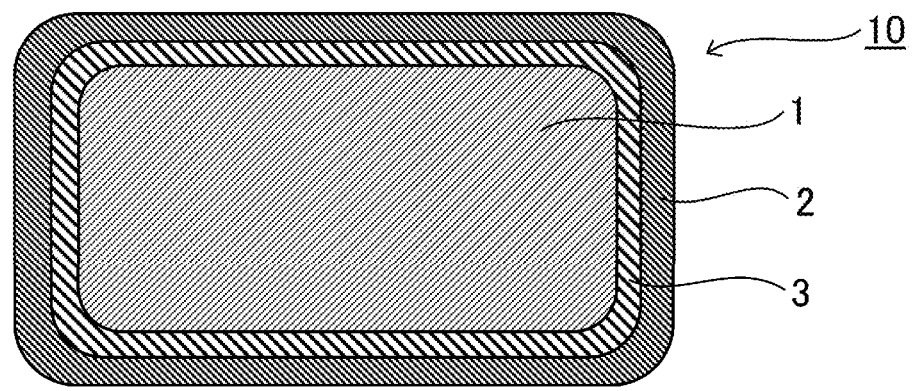

{Fig. 10}
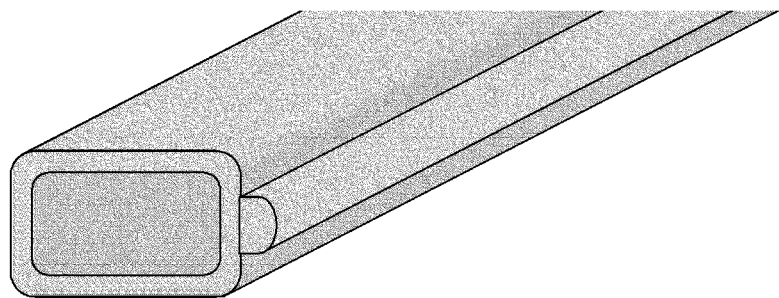
{Fig. 11}
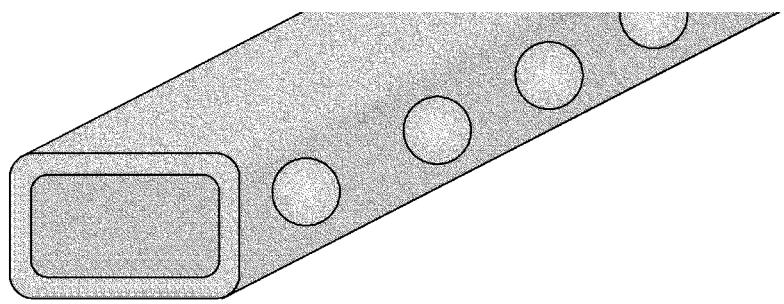

INSULATED WIRE, COIL, AND ELECTRIC/ELECTRONIC EQUIPMENTS

CROSS-REFERENCE TO RELATED APPLICATIONS

This application is a Continuation of PCT International Application No. PCT/JP2019/004970 filed on Feb. 13, 2019, which claims priority under 35 U.S.C. § 119 (a) to Japanese Patent Application No. 2018-025805 filed in Japan on Feb. 16, 2018. Each of the above applications is hereby expressly incorporated by reference, in its entirety, into the present application.

TECHNICAL FIELD

The present invention relates to an insulated wire, a coil, and electric/electronic equipments.

BACKGROUND ART

An insulated wire whose conductor is coated with an insulating film is used for a coil that is incorporated into various kinds of electric/electronic equipments. The coil is especially heavily used for electric/electronic equipments represented by motors and transformers. With size reduction and improved performance of the electric/electronic equipments in recent years, the insulated wire is pushed into a very narrow area. As such, a ratio (conductor space factor) of cross-sectional area of all conductors (a total of conductor cross-sectional areas in each insulated wire) to a slot cross-sectional area of a stator becomes very high. It is not too much to say that performances of the electric/electronic equipments are determined by the conductor space factor in a stator slot.

In a case of minutely filling the inside of the stator slot with insulated wires having a round cross-section, dead spaces (spaces between insulated wires) exist. In order to improve a space factor for such insulated wires having a round cross-section, insulated wires of the rectangular wire whose conductor cross-sectional shape is similar to quadrangle (square or rectangle) have come to be used. Compared to the insulated wires having a round cross-section, the use of the rectangular wire allows reduction in the dead space, to thereby improve the conductor space factor in the stator slot.

Further, it is hoped that the conductor space factor in the stator slot will be improved by reducing the cross-sectional area of the insulating film. However, if the cross-sectional area of the insulating film is reduced, there is a possibility that its electrical performances (dielectric breakdown property, etc.) may become victimized.

In view of the forgoing circumstances, Patent Literature 1 describes insulated wires for winding that improves corona characteristics of a stator slot without an insulating paper and/or between insulated wires neighboring to each other, that makes the insulating film thinner, and also that is not easily scratched. This insulated wire has a thermoplastic resin covering layer formed directly or indirectly on a conductor, and also has a protrusion provided on the outermost layer of the thermoplastic resin covering layer.

CITATION LIST

Patent Literatures

Patent Literature 1: JP-A-2008-288106 ("JP-A" means unexamined published Japanese patent application.)

SUMMARY OF INVENTION

Technical Problem

According to the invention described in Patent Literature 1, even if the cross-sectional area of the insulating film is reduced, the above-described performances are developed in the stator slot without an insulating paper. However, the invention of Patent Literature 1 has even more room to improve bending workability for forming a coil of the insulated wire.

Further, many coils are designed to flow high electric current in order to improve motor efficiency in recent years, to thereby generate more Joule heat than before. If the coil becomes hot, eddy-current loss generates and this causes reduction in motor efficiency. Therefore, temperature increase of the coil is required to be suppressed.

The present invention is contemplated for providing insulated wires that have a high conductor space factor to a slot cross-sectional area and secure a desirable gap area, whereby a coil that can be efficiently cooled by a cooling liquid or gas can be realized, and that are excellent in bending workability. Further, the present invention is contemplated for providing a coil produced by winding processing the insulated wire. Further, the present invention is contemplated for providing an electric/electronic equipment, comprising the coil.

Solution to Problem

As a result of intensive studies, the present inventors have found that in the insulated wire having a thermoplastic resin layer as a covering layer directly or indirectly on a rectangular conductor, by designing it so that the insulated wire has at least one protruding part (protrusion) which is continuous in a longitudinal direction of said insulated wire, on the surface of a portion of the above-described thermoplastic resin layer corresponding to at least one side of the insulated wire cross-section; said protruding part and a flat part of the surface having the protruding part forms a curved portion with a specific radius of curvature; and a lateral face of the protruding part has a slope of less than 90° to the flat part of the surface having the protruding part, it is possible to achieve excellent bending workability, improvement of the conductor space factor in the stator slot, and further securement of the gap area for easy passage of a cooling liquid or gas, etc., even after being coiled. The present invention has been completed on a basis of these findings.

The above-described problems were solved by the following means.

<1>

An insulated wire comprising a thermoplastic resin layer (A) as a covering layer directly or indirectly on a rectangular conductor, wherein the insulated wire has at least one protruding part which is continuous in a longitudinal direction of said insulated wire, on a surface of a portion of the thermoplastic resin layer (A), which portion corresponds to at least one side of a cross-section of the insulated wire, wherein said protruding part and a flat part of the surface having the protruding part forms a curved portion with a radius of curvature of 0.01 to 0.75 mm in the cross-section of the insulated wire, and wherein a lateral face of the protruding part has a slope of less than 90° to the flat part of the surface having the protruding part in the cross-section of the insulated wire.

<2>
The insulated wire described in the item <1>, wherein the lateral face of the protruding part has a slope of 1 to 80° to the flat part of the surface having the protruding part.
<3>
The insulated wire described in the item <1> or <2>, wherein the height of the protruding part is 30 μm or more and 3000 μm or less.
<4>
The insulated wire described in any one of the items <1> to <3>, wherein the insulated wire has one of the protruding part on each surface of the portions of the thermoplastic resin layer (A), which portions correspond to at least a pair of two opposing sides of the cross-section of the insulated wire.
<5>
The insulated wire described in any one of the items <1> to <4>, wherein the insulated wire has two of the protruding part on each surface of the portions of the thermoplastic resin layer (A), which portions correspond to at least a pair of two opposing sides of the cross-section of the insulated wire.
<6>
The insulated wire described in any one of the items <1> to <5>, wherein the insulated wire has the protruding part on a surface of the portions of the thermoplastic resin layer (A), which portions correspond to short sides of the cross-section of the insulated wire.
<7>
The insulated wire described in any one of the above items <1> to <6>, comprising an insulating layer (B) between the rectangular conductor and the thermoplastic resin layer (A),
wherein the insulating layer (B) comprises a thermosetting resin.
<8>
The insulated wire described in any one of the above items <1> to <7>,
wherein a surface roughness Ra of the flat part of the thermoplastic resin layer (A) is 0.01 μm or more and 0.5 μm or less.
<9>
The insulated wire described in any one of the above items <1> to <8>, wherein a resin constituting the thermoplastic resin layer (A) is a polyetheretherketone, a polyphenylenesulfide, a polyethylene naphthalate, and/or a thermoplastic polyimide.
<10>
A coil produced by processing the insulated wire described in any one of the above items <1> to <9> by winding.
<11>
An electric/electronic equipment, comprising the coil described in the above item <10>.

Advantageous Effects of Invention

The insulated wire of the preset invention has a high conductor space factor to a slot cross-sectional area and secures a desirable gap area, whereby a coil that can be efficiently cooled by a cooling liquid or gas can be realized, and is excellent in bending workability (flex resistance). The preset invention can provide a coil produced by processing the insulated wire by winding. Further, the preset invention can provide an electric/electronic equipment, containing the coil.

BRIEF DESCRIPTION OF THE DRAWINGS

FIG. 1 is a cross-sectional view schematically showing one embodiment of the present invention in which two opposing long sides of an insulated wire cross-section each have two protruding parts which are continuous in a longitudinal direction of the insulated wire and two opposing short sides of the insulated wire cross-section each have one protruding part which is continuous in a longitudinal direction of the insulated wire.

FIG. 2 is a cross-sectional view schematically showing one embodiment of the present invention in which two opposing short sides of the insulated wire cross-section each have two of protruding parts which are continuous in a longitudinal direction of the insulated wire.

FIG. 3 is a cross-sectional view schematically showing one embodiment of the present invention in which two opposing long sides of the insulated wire cross-section each have one protruding part which is continuous in a longitudinal direction of the insulated wire and two opposing short sides of the insulated wire cross-section each have one protruding part which is continuous in a longitudinal direction of the insulated wire.

FIG. 4 is a cross-sectional view schematically showing one embodiment of the present invention in which two opposing long sides of the insulated wire cross-section each have one protruding part which is continuous in a longitudinal direction of the insulated wire.

FIG. 5 is a cross-sectional view schematically showing one embodiment of the present invention in which one short side of the insulated wire cross-section has one protruding part which is continuous in a longitudinal direction of the insulated wire.

FIG. 6 is a cross-sectional view schematically showing one embodiment of the present invention in which one long side of the insulated wire cross-section has one protruding part which is continuous in a longitudinal direction of the insulated wire and one short side of the insulated wire cross-section has one protruding part which is continuous in a longitudinal direction of the insulated wire.

FIG. 7 is a cross-sectional view schematically showing one embodiment of the present invention in which two opposing long sides of the insulated wire cross-section each have one protruding part which is continuous in a longitudinal direction of the insulated wire and two opposing short sides of the insulated wire cross-section each have one protruding part which is continuous in a longitudinal direction of the insulated wire.

FIG. 8 is a cross-sectional view schematically showing one embodiment of the present invention in which two opposing long sides of the insulated wire cross-section each have two protruding parts which are continuous in a longitudinal direction of the insulated wire and two opposing short sides of the insulated wire cross-section each have one protruding part which is continuous in a longitudinal direction of the insulated wire.

FIG. 9 is a cross-sectional view schematically showing the insulated wire produced in Comparative Example 3.

In one example of the insulated wire according to the present invention, FIG. 10 is a schematic view showing an embodiment having a protruding part that is continuous to a longitudinal direction of the insulated wire.

FIG. 11 shows one example of the insulated wire having a protruding part that is discontinuously formed to a longitudinal direction of the insulated wire.

MODE FOR CARRYING OUT THE INVENTION (Insulated Wire)

The insulated wire of the present invention has a thermoplastic resin layer (A) as a covering layer directly or indirectly on a rectangular conductor. The insulated wire of the present invention has at least one protruding part which is continuous in a longitudinal direction of said insulated wire, on the surface of a portion of the above-described thermoplastic resin layer (A) corresponding to at least one side of the insulated wire cross-section. The insulated wire of the present invention has a curved portion with a radius of curvature of 0.01 to 0.75 mm, that is formed by the above-described protruding part and a flat part of the surface having the protruding part in the insulated wire cross-section. In the insulated wire of the present invention, a lateral face of the protruding part has a slope of less than 90° to the flat part of the surface having the protruding part. The slope inclines toward the center of the protruding part. The above-described insulated wire cross-section means a cross-section perpendicular to a longitudinal direction of the insulated wire.

Hereinafter, one embodiment of the insulated wire according to the present invention is explained with reference to FIG. 1.

The insulated wire 10 of the present invention has a thermoplastic resin layer 2 as a covering layer on a rectangular conductor 1. In the insulated wire 10 of the present invention, surfaces of portions corresponding to two opposing long sides of the insulated wire cross-section each have two protruding parts which are continuous in a longitudinal direction of the insulated wire. These protruding parts each have a slope 5 of less than 90° to the flat part of the surface having the protruding part. In the insulated wire 10 of the present invention, two opposing short sides of the insulated wire cross-section each have one protruding part which is continuous in a longitudinal direction of the insulated wire. These protruding parts each have a slope 5 of less than 90° to the flat part of the surface having said protruding part. In the insulated wire 10 of the present invention, the boundary between the above-described protruding part and a flat part of the surface having said protruding part forms a curved portion 4 with a radius of curvature of 0.01 to 0.75 mm in the insulated wire cross-section.

FIG. 8 is another embodiment of the insulated wire according to the present invention, which is the same as the insulated wire according to the embodiment shown in FIG. 1, except for having an insulating layer 3 on the rectangular conductor 1 and having a thermoplastic resin layer 2 on the insulating layer 3.

Meanwhile, in the insulated wire of the embodiment shown in FIG. 1, the insulated wire may have an interlayer (A1) between the rectangular conductor 1 and the thermoplastic resin layer 2. It is the same for the insulated wires of the embodiments shown in FIGS. 5 to 7.

In the insulated wire of the embodiment shown in FIG. 8, the insulated wire may have an interlayer (A2) between the rectangular conductor 1 and the insulating layer 3. Further, the insulated wire may have an interlayer (B1) between the insulating layer 3 and the thermoplastic resin layer 2. It is the same for the insulated wires of the embodiments shown in FIGS. 2 to 4 and 8.

Illustration of the interlayers (A1), (A2) and (A3) is omitted.

Further, those layers each may be a single layer or multiple layers composed of two or more layers.

Hereinafter, the insulated wire of the present invention is explained from the rectangular conductor in order.

<Rectangular Conductor>

As the rectangular conductor used in the insulated wire of the present invention, use may be made of any conductor that is usually used in insulated wires and examples thereof include a metal conductor such as a copper wire and an aluminum wire. The conductor is a conductor of preferably a copper wire and more preferably a low-oxygen copper whose oxygen content is 30 ppm or less, and more preferably a low-oxygen copper whose oxygen content is 20 ppm or less or oxygen-free copper. When the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

Regarding the rectangular conductor used in the insulated wire of the present, the cross-sectional shape thereof is rectangular. The rectangular conductor has higher occupancy with respect to the stator slot at the time of winding, compared to a round conductor. Accordingly, the rectangular conductor is preferably used for this purpose.

In view of suppressing a partial discharge from a corner portion, the rectangular conductor has preferably such a shape that chamfered edges (curvature radius r) are provided at four corners as shown in FIGS. 1 to 8. The curvature radius r is 0.6 mm or less and in a range from 0.2 to 0.4 mm.

The size of the cross-section of the rectangular conductor is not particularly limited, but the width (long side) thereof is preferably from 1.0 to 5.0 mm, and more preferably from 1.4 to 4.0 mm, and the thickness (short side) is preferably from 0.4 to 3.0 mm, and more preferably from 0.5 to 2.5 mm. The ratio of length of the width (long side) to the thickness (short side) is preferably from 1:1 to 4:1.

Meanwhile, the cross-section of the rectangular conductor used in the insulated wire of the present invention may have the same width and length, i.e., may be nearly square. In a case where the cross-section of the conductor is nearly square, the long side means each of a pair of two opposing sides of the conductor cross-section, while the short side means each of the other pair of two opposing sides.

<Thermoplastic Resin Layer (A)>

The insulated wire of the present has a thermoplastic resin layer (A) composed of a thermoplastic resin.

The insulated wire of the present invention may have a thermoplastic resin layer (A) directly on the rectangular conductor, or may have a thermoplastic resin layer (A) as an extrusion-coated resin layer through an interlayer (A1), an insulating layer (B) and/or an interlayer (B). Meanwhile, the interlayers (A) and (B) may be formed in the same manner as the insulating layer (B). A method of forming the insulating layer (B) is described below.

By setting the extrusion-coated resin layer, an insulated wire having a high partial discharge inception voltage can be obtained.

The advantage of the extrusion-coating method is that because this method does not need to pass the rectangular conductor into a baking furnace in the production process, the thickness of the thermoplastic resin layer can be increased without causing a growth of the thickness of an oxide film layer of the rectangular conductor.

As a resin used in the extrusion-coated resin layer, a thermoplastic resin is used. In particular, it is preferred to use a thermoplastic resin which is excellent in heat resistance.

Examples of such thermoplastic resin include polytetrafluoroethylene (PTFE), a tetrafluoroethylene-hexafluoropropylene copolymer (FEP), a tetrafluoroethylene-ethylene copolymer (ETFE), a tetrafluoroethylene-perfluoroalkylvinylether copolymer (PFA), a thermoplastic polyamide (TPA), a thermoplastic polyester (TPE), polyethylene terephthalate (PET), polybutylene terephthalate (PBT), a thermoplastic polyimide (TPI), polyphenylenesulfide (PPS), polyethylene naphthalate (PEN), polyetheretherketone (PEEK), a modified polyetheretherketone (modified PEEK), and the like.

Among them, examples of commercially-available products of PEEK include KETASPIRE KT-820 (trade name, manufactured by Solvay Specialty Polymers LLC), and PEEK450G (trade name, manufactured by Victrex Japan Co., Ltd.). Examples of commercially-available products of the modified PEEK include AVASPIRE AV-650 (trade name, manufactured by Solvay Specialty Polymers LLC), and AV-651 (trade name, manufactured by Solvay Specialty Polymers LLC). Examples of commercially-available products of TPI include AURUM PL450C (trade name, manufactured by Mitsui Chemicals, Inc.). Examples of commercially-available products of PPS include FORTRON 0220A9 (trade name, manufactured by Polyplastics, Co., Ltd.), and PPS FZ-2100 (trade name, manufactured by DIC Corporation). Examples of commercially-available products of the thermoplastic PA include Nyron 6, 6 FDK-1 (trade name, manufactured by Unitika Ltd.), Nyron, 4, 6 F-5000 (trade name, manufactured by Unitika Ltd.), Nyron 6, T ARLEN AE-420 (trade name, manufactured by Mitsui Chemicals, Inc.), Nyron 9, T GENESTA N 1006D (trade name, manufactured by Kuraray Co., Ltd.), and the like.

Further, examples of the modified PEEK include PEEK-based PPS, PES, PPSU and/or PEI polymer alloys, for example, trade name: AVASPIRE AV-621, AV-630, AV-651, AV-722, AV-848, and the like, manufactured by Solvay Specialty Polymers LLC.

Among the thermoplastic resin, PEEK, PPS, TPI, and PEN are preferable.

Among them, considering both lowering of partial discharge inception voltage and resistance to solvents as a resin used in the extrusion-coated resin layer, it is more preferred to use a crystalline resin.

In particular, in the insulated wire of the present invention, because resistance to damage of the film at the time of coil-work is required, it is preferred to use a modified PEEK, PEEK, or PPS, each of which is crystalline and in particular, has a high elastic modulus.

Note that regarding use of a thermoplastic resin, only one kind thereof may be used alone, or more than one kind thereof may be used in mixture. Further, in a case of a laminated extrusion-coated resin layer composed of multiple thermoplastic resin layers (A), a thermoplastic resin which is different from each other in each layer may be used, or a mixing ratio of thermoplastic resins which is different from each other in each layer may be used.

In the case where two kinds of the thermoplastic resins are used in mixture, for example, both resins can be used by subjecting them to polymer alloy thereby making a compatible type uniform mixture, or can be used by forming a non-compatible blend into a compatible state with a compatibilizing agent.

The thickness of the extrusion-coated resin layer is not particularly limited, but is preferably from 30 to 300 µm. This thickness means a thickness without protruding parts, i.e., a thickness of the flat part. If the thickness of the extrusion-coated resin layer is too small, insulation properties are reduced and partial discharge deterioration easily occurs, whereby the requirements for a coil cannot be met.

If the thickness of the extrusion-coated resin layer is too large, stiffness of the insulated wire becomes too high and bending work becomes difficult, which results in leading to cost increase.

In the insulated wire of the present invention, the thickness of the extrusion-coated resin layer is more preferably 50 to 250 µm, furthermore preferably 60 to 200 µm.

The surface roughness Ra of the flat part of the thermoplastic resin layer (A) is not particularly limited, but is preferably 0.01 µm or more and 0.5 µm or less. By being in this range, the insulated wire of the present invention excels in cooling efficiency with a cooling oil. In the explanation of the present invention, note that the surface roughness Ra is defined to be a value obtained under the following measuring condition by using a contact-type surface roughness meter SURFCOM FLEX-50A (trade name) manufactured by Tokyo Seimitsu Co., Ltd., or a non-contact-type laser micrometer VK-X (trade name) manufactured by Keyence Corporation in accordance with JIS B 0601:2013.

(Measuring Condition)

Regarding the length (measured length) for measuring Ra, measurement is conducted with standard value of the evaluation length described in JIS B 0633:2001. In order to measure the surface shape correctly, if needed, a surface deposit, etc. is removed by air blow, and in a case where oil, etc. is coated, the oil, etc. is lightly washed with a waste cloth soaked with an organic solvent such as hexane, etc. As for the measurement environment, temperature is set to 25° C.±5° C. and humidity is set to 50%±10%. In consideration of impact on measurement results, a sample is straightened as much as possible while not deforming a film. The measurement is performed by using the average value of N=10, provided that the datum per 1 point of the measured length is N=1.

The insulated wire of the present invention has at least one protruding part which is continuous in a longitudinal direction of said insulated wire, on the surface of a portion corresponding to at least one side of the insulated wire cross-section, that is, the surface of the thermoplastic resin layer (A). In the insulated wire of the present invention, a radius of curvature of the curved portion which is formed by the above-described protruding part and a flat part of the surface having the protruding part in the insulated wire cross-section is 0.01 to 0.75 mm, and a lateral face of the protruding part has a slope of less than 90° to the flat part of the surface having the protruding part. That is, in the above-described insulated wire cross-section, the protruding part does not have a lateral face portion that is raised perpendicular to the flat part of the surface having the protruding part.

Adjustment of the radius of curvature to a range of 0.01 to 0.75 mm allows a combination of improvement in bending workability and securement of the gap area.

Further, by the form in which the protruding part is continuous in a longitudinal direction of the insulated wire, flex resistance can be improved.

Further, if the protruding part has no slope, that is, the lateral face of the protruding part is perpendicular to a surface of the portion (flat part) corresponding to the side, when a wire material is subjected to a bending work, a stress concentrates on the area at which the protruding part and the flat part come into contact with each other (a joint of the protruding part and the flat part), to thereby crack at the extrusion-coating layer and make it difficult to maintain insulation properties.

The angle of the above-described slope to the flat part surface (base level) is less than 90°. In order to improve both the gap area and the workability, the range of 5 to 80° is preferred and the range of 10 to 60° is more preferred. The upper limit of the angle is more preferably less than 60°, from the standpoint of a bending workability, particularly preferably less than 30°.

It is preferable that the value of a/b is 0.6 or more and 0.9 or less, provided that in one side having a protruding part in the cross-sections of the insulated wire according to the present invention, the film thickness (minimum film thickness) of the flat part of the thermoplastic resin layer (A) without the protruding part is expressed as "a" μm, and the film thickness (maximum film thickness) of the thermoplastic resin layer (A) at the maximum height portion of the protruding part is expressed as "b" μm (in a case where one side has a plurality of protruding parts, the average value of maximum film thicknesses of each of the protruding parts is expressed as "b" μm). Accordingly, in a case where multiple sides have a protruding part, in each of the sides, the value of a/b is preferably 0.60 or more and 0.90 or less.

Further, in a case where one side has multiple protruding parts, in each of the protruding parts, the value of a/b is particularly preferably 0.60 or more and 0.90 or less.

Herein, the minimum film thickness means a film thickness without a protruding part as described above and is a film thickness of the portion at which no protruding part is formed on the same side.

In the insulated wire of the present invention, note that the protruding part is not limited only to those in which the film thickness shows inflection points on both sides of the protruding part. For example, as the case of the protruding part provided on the edge of the side, the protruding part includes those which show no inflection point in an edge direction or in a short side direction (thickness direction) of the side at which the protruding part has been formed. Further, in the protruding part of the insulated wire according to the present invention, the protruding part and the edge of each side, or the protruding part and the flat part smoothly connect to each other. The protruding part and the flat part of the side having said protruding part has a curved portion with a radius of curvature of 0.01 to 0.75 mm. Since this protruding part is not raised in a rectangular shape from the flat part, a stress does not concentrate on a boundary between said protruding part and each side edge, or a boundary between said protruding part and a flat part. Herein, in a case of having the protruding part on a one-by-one basis at near both edges of the side, the connection between the protruding part and the edge of the side may be achieved by connecting the protruding part and the edge of the side through a flat part, or by directly connecting them.

The value of a/b is preferably 0.65 or more and 0.85 or less, more preferably 0.70 or more and 0.80 or less.

On the other hand, among them, the minimum film thickness a is preferably 30 μm or more and 200 μm or less, more preferably 50 μm or more and 170 μm or less, furthermore preferably 80 μm or more and 140 μm or less, particularly preferably 90 μm or more and 120 μm or less.

Further, the average value b, which is the maximum film thickness of the protruding part or the average of the maximum film thicknesses of the protruding parts is preferably 30 μm or more and 350 μm or less, more preferably 40 μm or more and 250 μm or less, and furthermore preferably 50 μm or more and 200 μm or less. In addition, the average value b is preferably 60 μm or more and 3200 μm or less.

Further, in order to secure a sufficient gap area and to thereby improve cooling efficiency, the height of the protruding part, that is, the distance (b-a) of from the flat part surface to the maximum height portion of the protruding part is preferably 30 μm or more and 3000 μm or less, and more preferably 50 μm or more and 300 μm or less. In addition, the distance is also preferably 20 μm or more and 300 μm or less.

As for the cross-sectional shape of the protruding part in the present invention, as shown in FIGS. 1 to 8, it is preferable to be a protruding part in which the thickness gradually increases and conversely, the thickness gradually decreases after passing the maximum point of the protruding part and therefore it is preferable to be a so-called chevron-shaped protruding part having one summit (in this case, the maximum height is at the summit). That is, such a protruding part that after passing a summit of the protruding part (such a summit of the maximum point that the thickness sequentially increases even if the thickness becomes flat at one time toward the maximum point, in other words, sequentially increases without decrease), the thickness sequentially decreases without increase, is preferred.

Meanwhile, the ratio of the bottom (base) of one protruding part to the side is preferably L/2 to L/10, provided that the length of the side is L.

(Placement of Protruding Part)

Regarding the placement of the protruding part of the insulated wire according to the present invention, the following embodiments 1) to 3) are preferable.
1) Each of the parts of the thermoplastic resin layer (A) surface corresponding to at least a pair of two opposing sides of the insulated wire cross-section has a protruding part on a one-by-one basis (for example, FIGS. 4 and 7). Such placement of the protruding parts allows efficient securement of a desired gap area even if the insulated wire is bent in either the edge direction or the flat direction when coiling.
2) Each of the parts of the thermoplastic resin layer (A) surface corresponding to at least a pair of two opposing sides of the insulated wire cross-section has two protruding parts on a one-by-one basis (for example, FIG. 2). By such placement of the protruding parts, when stacking insulated wires, it is possible to stabilize the insulated wires to a specified position, and when mounted as a motor in a vehicle, the motor becomes resistant to vibration.
3) Each of the parts of the thermoplastic resin layer (A) surface corresponding to short sides of the insulated wire cross-section has a protruding part (for example, FIG. 5). By such placement of the protruding part, because there is a space between the insulated wire and a core in the slot, it becomes possible to cool effectively even any part other than the coil edge.

Note that, in the description, the "side" means only a straight-line portion containing no edge portion having the above-described curvature radius r, so-called, a straight-line portion before setting a protruding part.

In the insulated wire of the present invention, in a case where each of the surfaces of the parts corresponding to a pair of two opposing sides has a protruding part, the a/b value of these protruding parts may be designed to be the same value or to be a different value from each other. In this case, regarding the placement of the protruding parts at the two opposing sides of the cross-sectional shape, it is preferable to be point-symmetrical or line-symmetrical with respect to the center point or the center line of the two opposing sides. The height of the protruding parts may be different for each side or each protruding part. However, in a case where there are two protruding parts on the same side, assuming the usage of the insulated wire, it is preferable that the height of each of the protruding parts is the same.

Here, in the cross-section of the insulated wire of the present invention, in the case where one side has one protruding part, it is preferred that the protruding part is located in the vicinity of the center of the side.

On the other hand, in a case where there are at least two protruding parts on one side, it is preferable that the protruding parts are located on a one-by-one basis in the vicinity of both edges of the side. Further, it is preferable that one protruding part is located in the vicinity of one edge of the side and the other protruding part is located between the halfway point from the center of the side to the edge of the side without said protruding part and the edge of the side without said protruding part. Further, it is preferable that one protruding part is located between the halfway point from the center of the side to one edge of the side and said edge of the side while the other protruding part is located between the halfway point from the center of the side to the other edge of the side and said other edge of the side.

In the case where one side has at least two protruding parts, it is particularly preferred that one protruding part is each located in the vicinity of each of both edges thereof, or one protruding part is located in a leftward range from a halfway point between the center of the side and the edge of the side to the edge of the side and the other protruding part is located in a rightward range from the halfway point between the center of the side and the other edge of the side to said other edge.

Note that the term "in the vicinity of the center of the side" means the center of the side and a range of ±L/10 from the center of the side, provided that L represents a length of the side. In the present invention, it is preferred to set a maximum point of the protruding part at a center point.

On the other hand, the term "in the vicinity of the edge of the side" means a range of ±L/10 from the edge of the side. In the present invention, it is preferred to set a maximum point of the protruding part in the vicinity of the edge of the side.

The thermoplastic resin layer (A) having such cross-sectional shape can be formed by subjecting a resin to extrusion coating by means of an extruder using a die similar to a desired cross-sectional shape.

In the insulated wire of the present invention, at least one of a crystallization nucleating agent, a crystallization accelerator, a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer may be incorporated into the material for obtaining an extrusion-coated resin layer, to the extent that the characteristics are not affected. Furthermore, a layer formed from a resin containing these additives may be laminated on the resulting insulated wire, or the insulated wire may be coated with a coating material containing these additives.

<Insulating Layer (B)>

The insulated wire of the present invention may have at least one insulating layer (B) composed of a thermosetting resin as an enamel-baked layer between a rectangular conductor and a thermoplastic resin layer (A) so that both provision of heat resistance and insulation of the conductor are effectively ensured.

Further in the insulated wire of the present invention, the single layer means that even in a case where layers in which resins forming the layers and additives contained therein are the same in each of the layers, are laminated, these layers are regarded as the same layer. Even in a case that the layers are composed of the same resins, when compositions constituting the layers are different from one another such that, for example, a kind of additives or a compounding amount is different from one another, these layers are counted as layers different from each other.

This definition is also applied to layers other than the enamel-baked layer.

The enamel-baked layer is formed by coating and baking a resin varnish on a rectangular conductor more than once. If needed, the enamel-baked layer may contain at least one of an antioxidant, an antistatic agent, a ultraviolet inhibitor, a light stabilizer, a fluorescent whitening agent, a pigment, a dye, a compatibilizing agent, a lubricant, a toughening agent, a frame retardant, a cross-linking agent, a cross-link aid, a plasticizer, a thickener, a viscosity depressant, and an elastomer. As a method of coating a resin varnish, an ordinary method may be used. For example, there is a method of employing a die for coating a varnish, which is similar to the shape of the conductor. The rectangular conductor coated with the foregoing resin varnish is baked in a baking furnace also in accordance with an ordinary method. Specific baking conditions depend on the shape or the like of the furnace. However, in the case of about 8 m-natural convection type vertical furnace, the baking can be achieved by setting the transit time to the range of 10 to 90 sec at the rage of 400 to 500° C.

The resin varnish use an organic solvent and the like so as to make a thermosetting resin be a varnish, the organic solvent is not particularly limited as long as the organic solvent does not inhibit the reaction of the thermosetting resin, and examples thereof include amide-based solvents such as N-methyl-2-pyrrolidone (NMP), N,N-dimethylacetamide (DMAC), dimethyl sulfoxide, and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; and sulfone-based solvents such as sulfolane.

Among these, in view of high solubility, high reaction promotion properties or the like, the amide-series solvent or the urea-series solvent is preferred; and in view of having no hydrogen atom that is apt to inhibit a crosslinking reaction due to heating, N-methyl-2-pyrrolidone, N,N-dimethylacetamide, N,N-dimethylethyleneurea, N,N-dimethylpropyleneurea or tetramethylurea is further preferred, and N-methyl-2-pyrrolidone is particularly preferred.

Note that the enamel-baked layer of the thermosetting resin layer (B) may be set directly on the outer periphery of the rectangular conductor, or may be set via an interlayer (A).

As the thermosetting resin for the thermosetting resin varnish, materials used for ordinary enamel wires can be used. Examples thereof include polyamideimide (PAI), polyimide (PI), polyesterimide, polyetherimide, polyimide-hydantoin-modified polyester, polyamide, formal, polyurethane, a thermosetting polyester (PEst), Class H polyester (HPE), polyvinylformal, an epoxy resin, and polyhydantoin.

Polyimide-series resins such as a polyimide (PI), a polyamideimide (PAI), a polyesterimide, a polyetherimide, and a polyimidehydantoin-modified polyester are preferable, since they are excellent in heat resistance. An ultraviolet curable resin and the like may be used.

Further, regarding these thermosetting resins, only one kind thereof may be used alone, or more than one kind thereof may be used by mixture. Further, in a case of a laminated enamel-baked layer composed of multi-layered thermosetting resin layers (B), thermosetting resins which are different from each other in each layer may be used, or thermosetting resins whose mixing ratios are different from each other in each layer may be used.

In the insulated wire of the present invention, as a thermosetting resin, a thermosetting resin selected from the group consisting of a polyimide (PI), a polyamideimide (PAI), a thermosetting polyester (PEst), a and an Class H polyester (HPE) is preferable, a polyimide (PI) or a polyamideimide (PAI) is more preferable, a polyimide (PI) is particularly preferable.

Here, the Class H polyester (HPE) means an aromatic polyester resin modified by adding thereto a phenol resin or the like and the heat resistant grade thereof is Class H. Examples of commercially available Class H polyesters (HPE) include Isonel200 (trade name, manufactured by Schenectady International Inc.).

The polyimide (PI) is not particularly limited, but any of polyimide resins such as a whole aromatic polyimide and a thermosetting aromatic polyimide may be used. For example, use may be made of a commercially available product (for example, trade name, U IMIDE, manufactured by Unitika Ltd.; trade name, U-VARNISH, manufactured by Ube Industries, Ltd.; and trade name, #3000, manufactured by Du Pont-Toray Co., Ltd.). Further, use may be made of polyimides obtained by a usual method in which an aromatic tetracarboxylic dianhydride and aromatic diamines are reacted in a polar solvent to obtain a polyamide acid solution, and then the obtained polyamide acid solution is subjected to imidization by a thermal treatment at the time of baking in formation of the coating.

Regarding example of the polyamideimide (PAI), use may be made of a commercially available product (for example, trade name, HI406, manufactured by Hitachi Chemical Co., Ltd.). Further, use may be made of polyamideimides obtained by a usual method, for example, a method in which a tricarboxylic anhydride and diisocyanates are directly reacted in a polar solvent, or a method in which diamines are reacted with a tricarboxylic anhydride in a polar solvent to previously introduce an imide bond to the reaction product, and then the reaction product is subjected to amidation using diisocyanates.

Note that the polyamideimide (PAI) has the properties of a lower thermal conductivity and a higher dielectric breakdown voltage than other resins, and also has bake hardenability.

In order to prevent adhesion between the rectangular conductor and the enamel-baked layer from being extremely lowered in a case where the number of passages through a baking furnace is reduced, the thickness of the enamel-baked layer is preferably 80 μm or less, more preferably 60 μm or less, and particularly preferably 50 μm or less. Further, in order to prevent deterioration of voltage resistance or heat resistance, which are properties required for the enameled wires as insulated wires, it is preferable that the enamel-baked layer has a certain thickness. The lower limit of the thickness of the enamel-baked layer is not particularly limited, as long as it is a thickness where no pinholes are formed. The thickness of the enamel-baked layer is preferably 3 μm or more, more preferably 6 μm or more.

The enamel-baked layer is may be a single layer or a multiple layers.

(Method of Producing an Insulated Wire)

A method of producing an insulated wire of the present invention is as explained in individual layers.

The insulated wire of the present invention is applicable to a field which requires resistance to voltage and heat resistance, such as various kinds of electric/electronic equipment. For example, the insulated wire of the present invention is used for a motor, a transformer and the like, which can compose high-performance electric equipment by being processed into a coil. In particular, the insulated wire is favorably used as a winding for a driving motor of HV (Hybrid Vehicles) and EV (Electric Vehicles).

EXAMPLES

The present invention will be described in more detail based on examples given below, but the invention is not meant to be limited by these.

Example 1

Example 1 is described referring to FIG. 1.

As the rectangular conductor 1, a cross-section rectangular (long side 3.2 mm×short side 2.4 mm, curvature radius of chamfered edge at four corners r=0.3 mm) conductor (copper having an oxygen content of 15 ppm) was used.

The rectangular conductor 1 was used as a core wire and an extrusion-coated resin layer was formed as described below using a screw of the extruder specified by 30 mm full flight, L/D=20, and compression ratio 3.

In formation of a thermoplastic resin layer 2 (extrusion-coated resin layer 2), a polyetherether ketone (PEEK) (trade name, KETASPIRE KT-820, manufactured by Solvay Specialty Polymers, LLC, relative permittivity: 3.1) was used. The PEEK was extrusion-coated using an extrusion die in such a manner that the outer shape of the cross-section of the extrusion-coated resin layer 2 became a shape similar to the shape shown in FIG. 1 thereby to prepare an insulated wire of Example 1.

Example 2

Example 2 is described referring to FIG. 2.

As the rectangular conductor 1, a cross-section rectangular (long side 3.2 mm×short side 2.4 mm, curvature radius of chamfered edge at four corners r=0.3 mm) conductor (copper having an oxygen content of 15 ppm) was used.

In formation of a thermosetting resin layer 3 [inner insulating layer 3], a die having a shape similar to the shape of the thermosetting layer (A) to be formed on the rectangular conductor 1 was used. A polyimide resin (PI) varnish (trade name, U-IMIDE, manufactured by Unitika Ltd.) was coated on the rectangular conductor 1, and then the coated rectangular conductor was passed through a 8 m-long baking furnace set to 450° C. at a speed requiring 15 seconds for the baking time, and then this step was repeated several times to form the thermosetting resin layer 3, thereby obtaining an enamel wire.

The obtained enamel wire was used as a core wire. An extrusion-coated resin layer 2 was formed as described below using a screw of the extruder specified by 30 mm full flight, L/D=20, and compression ratio 3.

In formation of an extrusion-coated resin layer 2, a polyetherether ketone (PEEK) (trade name, KETASPIRE KT-820, manufactured by Solvay Specialty Polymers, LLC, relative permittivity: 3.1) was used. The PEEK was extrusion-coated using an extrusion die in such a manner that the outer shape of the cross-section of the extrusion-coated resin layer 2 became a shape similar to the shape shown in FIG. 2. Thereby an insulated wire of Example 2 having the extrusion-coated resin layer 2 at the outer side of the thermosetting resin layer 3 was prepared.

Examples 3 to 9 and Comparative Examples 1 to 4

Insulated wires of Examples 3 to 9 and Comparative Examples 1 to 4 were prepared in the same manner as Example 1 or 2, except that the constituent shown in Table 1 was employed.

The thus-obtained insulated wires were evaluated below. The obtained results are shown in Table 1 below as a whole.
(Measurement of Gap Area)

For measurement of a gap area, the dimension of the insulated wire was determined using a micrometer as described in JIS C 3216-2. From the two aspects obtained, the maximum cross-sectional area that the insulated wire can have by A side×B side after coil forming was calculated (explaining with reference to FIG. 3, the maximum cross-sectional area is computed by multiplying "a length from the summit of the protruding part on the surface of the portion corresponding to one short side to the summit of the protruding part on the surface of the portion corresponding to the opposing short side" by "a length from the summit of the protruding part on the surface of the portion corresponding to one long side to the summit of the protruding part on the surface of the portion corresponding to the opposing long side"). Further, by microscopic observation of the cross-section after resin embedding and polishing, the cross-sectional area of the insulated wire was observationally measured. (Maximum cross-sectional area)−(Measured value of the cross-sectional area) is defined as a gap area through which a cooling medium is passed.
Evaluation criteria is shown below. "A" to "C" are acceptable levels.
(Evaluation Criteria)
A: 30 mm² or more
B: 1 mm² or more and less than 30 mm²
C: 0.2 mm² or more and less than 1 mm²
D: less than 0.2 mm²
(Flex Resistance Test)
(1) Edge-Wise Test after Pre-Elongation of 20%

The edge-wise bending test was conducted according to JIS C 3216-3. On the assumption of use in more severe environment, an insulated wire elongated until 120% in advance was used, provided that the length of the insulated wire after the above-described preparation thereof was 100%. The insulated wire was wrapped around a SUS rod of ϕ1.5 mm so that incision (width of 1.0 μm in a circumferential direction and depth of 5 μm) portion became a center. The insulated wire in which the thermoplastic resin layer (A) cracked and a cleavage spread all over the front of the conductor was ranked as "C". The insulated wire in which a cleavage spread in the thermoplastic resin layer (A), but did not reach to the conductor was ranked as "B". The insulated wire in which because the incision portion was elongated together, the incision did not spread was ranked as "A". In this way, the insulated wire was rated in terms of these three ranks. "B" or more are acceptable levels.
(2) Flat-Wise Test after Pre-Elongation of 20%

The flat-wise bending test was conducted according to JIS C 3216-3. On the assumption of use in more severe environment, an insulated wire elongated until 120% in advance was used, provided that the length of the insulated wire after the above-described preparation thereof was 100%. The insulated wire was wrapped around a SUS rod of ϕ1.5 mm so that incision (width of 1.0 μm in a circumferential direction and depth of 5 μm) portion became a center. The insulated wire in which the thermoplastic resin layer (A) cracked and a cleavage spread all over the front of the conductor was ranked as "C". The insulated wire in which a cleavage spread in the thermoplastic resin layer (A), but did not reach to the conductor was ranked as "B". The insulated wire in which because the incision portion was elongated together, the incision did not spread was ranked as "A". In this way, the insulated wire was rated in terms of these three ranks. "B" or more are acceptable levels.
(Conductor Space Factor)

The above-described conductor space factor was calculated in accordance with the following expression:

$$[(\text{Cross-sectional area of conductor})/(\text{Measured value of cross-sectional area})] \times 100(\%).$$

The cross-sectional area of the insulated wire and the cross-sectional area of the conductor were observationally measured by microscopic observation of the cross-section after resin embedding and polishing in the same manner as the above-described measurement of the gap area. Evaluation criteria is shown below.
—Evaluation Criteria—
A: more than 94% and 100% or less
B: more than 90% and 94% or less
C: more than 86% and 90% or less

TABLE 1

| | | Ex 1 | Ex 2 | Ex 3 | Ex 4 | Ex 5 | Ex 6 |
|---|---|---|---|---|---|---|---|
| Film constitution | Insulating layer (B) | — | PI | — | PAI | PI | — |
| | Thermoplastic resin layer (A) | PEEK | PEEK | PPS/PEEK | PPS | TPI | PEN |
| | Thickness of insulating layer (B) (μm) | — | 30 | — | 30 | 30 | — |
| | Thickness of thermoplastic resin layer (A) (μm) | 180 | 150 | 80/80 | 90 | 100 | 130 |
| Embodiment of protruding part | Placement of protruding part | FIG. 1 | FIG. 2 | FIG. 7 | FIG. 4 | FIG. 2 | FIG. 6 |
| | Radius of curvature (mm) | 0.05 | 0.2 | 0.01 | 0.05 | 0.2 | 0.05 |
| | Inclination angle (°) | 5 | 5 | 60 | 15 | 80 | 15 |
| | Height (μm) | 50 | 150 | 300 | 300 | 3000 | 50 |
| | Continuity | Continuous | Continuous | Continuous | Continuous | Continuous | Continuous |
| | Surface roughness Ra of flat part (μm) | 0.05 | 0.1 | 0.2 | 0.05 | 0.2 | 0.1 |
| | Gap area | C | C | B | B | B | C |
| Flex | Edge-wise test after | B | B | B | A | B | B |

TABLE 1-continued

|  |  | | | | | | |
|---|---|---|---|---|---|---|---|
| resistance test | pre-elongation of 20% | | | | | | |
|  | Flat-wise test after pre-elongation of 20% | B | A | B | B | A | A |
| Conductor space factor | | A | A | B | B | B | A |
| Total evaluation | | Passed | Passed | Passed | Passed | Passed | Passed |

|  |  | Ex 7 | Ex 8 | Ex 9 | Ex 10 | Ex 11 | Ex 12 |
|---|---|---|---|---|---|---|---|
| Film constitution | Insulating layer (B) | — | PAI | — | — | — | — |
|  | Thermoplastic resin layer (A) | TPI | PPS | PEEK | PEEK | PEEK | PEEK |
|  | Thickness of insulating layer (B) (μm) | — | 30 | — | — | — | — |
|  | Thickness of thermoplastic resin layer (A) (μm) | 130 | 90 | 180 | 180 | 180 | 180 |
| Embodiment of protruding part | Placement of protruding part | FIG. 5 | FIG. 3 | FIG. 7 | FIG. 7 | FIG. 7 | FIG. 7 |
|  | Radius of curvature (mm) | 0.05 | 0.2 | 0.75 | 0.07 | 0.06 | 0.15 |
|  | Inclination angle (°) | 5 | 80 | 2 | 28 | 32 | 62 |
|  | Height (μm) | 300 | 3200 | 25 | 25 | 25 | 25 |
|  | Continuity | Continuous | Continuous | Continuous | Continuous | Continuous | Continuous |
| Surface roughness Ra of flat part (μm) | | 0.2 | 0.05 | 0.1 | 0.1 | 0.1 | 0.1 |
| Gap area | | B | A | C | C | C | C |
| Flex resistance test | Edge-wise test after pre-elongation of 20% | B | B | A | A | B | B |
|  | Flat-wise test after pre-elongation of 20% | B | A | A | A | A | B |
| Conductor space factor | | A | C | A | A | B | B |
| Total evaluation | | Passed | Passed | Passed | Passed | Passed | Passed |

|  |  | CEx 1 | CEx 2 | CEx 3 | CEx 4 |
|---|---|---|---|---|---|
| Film constitution | Insulating layer (B) | PI | — | PAI | PAI |
|  | Thermoplastic resin layer (A) | PEEK | PEEK | PPS | PPS |
|  | Thickness of insulating layer (B) (μm) | 30 | — | 30 | 30 |
|  | Thickness of thermoplastic resin layer (A) (μm) | 150 | 180 | 90 | 90 |
| Embodiment of protruding part | Placement of protruding part | FIG. 8 | FIG. 1 | FIG. 9 | FIG. 8 |
|  | Radius of curvature (mm) | 0.005 | 0.5 | — | 0.8 |
|  | Inclination angle (°) | 85 | 5 | — | 80 |
|  | Height (μm) | 50 | 50 | — | 3100 |
|  | Continuity | Continuous | Discontinuous | — | Continuous |
| Surface roughness Ra of flat part (μm) | | 0.1 | 0.05 | 0.05 | 0.1 |
| Gap area | | C | C | D | D |
| Flex resistance test | Edge-wise test after pre-elongation of 20% | C | C | A | A |
|  | Flat-wise test after pre-elongation of 20% | C | C | A | A |
| Conductor space factor | | A | A | A | C |
| Total evaluation | | Not passed | Notpassed | Not passed | Not passed |

Ex: Example
CEx: Comparative Example

<Notice of Table>

The thickness of the thermoplastic resin layer (A) is the thickness of the flat part.

The "inclination angle" means that a lateral face of the protruding part has a slope of each specific inclination angle to the base level having the above-described protruding part.

The "continuous" means that the protruding part is continuously formed in a longitudinal direction of the insulated wire (see FIG. 10), while "discontinuous" means that the protruding part is not continuously formed in a longitudinal direction of the insulated wire (see FIG. 11).

The thermoplastic resin layer (A) of Example 3 is composed of 80 PPS layer having a thickness of 80 μm and PEEK layer having a thickness of 80 μm.

(Thermosetting Resin Layer)
  PI: trade name, U-IMIDE, manufactured by Unitika Ltd.
  PAI: trade name, HI406 series, manufactured by Hitachi Chemical Co., Ltd.

(Thermoplastic resin layer)
  PEEK: trade name, KETASPIRE KT-820, manufactured by Solvay Specialty Polymers, LLC, relative permittivity: 3.1
  PPS: trade name, FZ-2100, manufactured by DIC Corporation
  TPI: trade name, AURUM PL450C, manufactured by Mitsui Chemicals, Inc.
  PEN: trade name, TEONEX TN8050SC, manufactured by TEIJIN LIMITED.

As is apparent from Table 1, the insulated wires of Comparative Examples 1 and 4 were not passed in the total evaluations since the curvature radius did not satisfy the definition of the present invention. Further, the insulated wire of Comparative Example 2 was not passed in the total evaluations since the protruding part is not continuous. Further, the insulated wire of Comparative Example 3 was not passed in the total evaluations since not having a protruding part.

In contrast, the insulated wires of the present invention (Examples 1 to 9) passed in the total evaluation.

The results above show that the insulated wire of the present invention is preferably applicable to a coil, especially electric/electronic equipment such as a motor coil.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2018-25805 filed in Japan on Feb. 16, 2018, which is entirely herein incorporated by reference.

REFERENCE SIGNS LIST

10 Insulated wire
1 Rectangular conductor
2 Thermoplastic resin layer (extrusion-coated resin layer)
3 Thermosetting resin layer (insulating layer)
4 Curved portion
5 Slope

The invention claimed is:

1. An insulated wire comprising a thermoplastic resin layer (A) as a covering layer directly or indirectly on a rectangular conductor,
    wherein the insulated wire has at least one protruding part which is continuous in a longitudinal direction of said insulated wire, on a surface of a portion of the thermoplastic resin layer (A), which portion corresponds to at least one side of a cross-section of the insulated wire,
    wherein said protruding part and a flat part of the surface having the protruding part forms a curved portion with a radius of curvature of 0.01 to 0.75 mm in the cross-section of the insulated wire, and
    wherein a lateral face of the protruding part has a slope of less than 90° to the flat part of the surface having the protruding part in the cross-section of the insulated wire.

2. The insulated wire according to claim 1, wherein the lateral face of the protruding part has a slope of 1 to 80° to the flat part of the surface having the protruding part.

3. The insulated wire according to claim 1,
    wherein the height of the protruding part is 30 μm or more and 3000 μm or less.

4. The insulated wire according to claim 1, wherein the insulated wire has one of the protruding parts on each surface of the portions of the thermoplastic resin layer (A), which portions correspond to at least a pair of two opposing sides of the cross-section of the insulated wire.

5. The insulated wire according to claim 1, wherein the insulated wire has two of the protruding parts on each surface of the portions of the thermoplastic resin layer (A), which portions correspond to at least a pair of two opposing sides of the cross-section of the insulated wire.

6. The insulated wire according to claim 1, wherein the insulated wire has the protruding part on a surface of the portions of the thermoplastic resin layer (A), which portions correspond to short sides of the cross-section of the insulated wire.

7. The insulated wire according to claim 1, comprising an insulating layer (B) between the rectangular conductor and the thermoplastic resin layer (A),
    wherein the insulating layer (B) comprises a thermosetting resin.

8. The insulated wire according to claim 1,
    wherein a surface roughness Ra of the flat part of the thermoplastic resin layer (A) is 0.01 μm or more and 0.5 μm or less.

9. The insulated wire according to claim 1, wherein a resin constituting the thermoplastic resin layer (A) is a polyetheretherketone, a polyphenylenesulfide, a polyethylene naphthalate, and/or a thermoplastic polyimide.

10. A coil produced by processing the insulated wire according to claim 1 by winding.

11. An electric/electronic equipment comprising the coil according to claim 10.

\* \* \* \* \*